W. A. McCOOL.
VULCANIZING MOLD.
APPLICATION FILED DEC. 2, 1910.
1,019,506.
Patented Mar. 5, 1912.
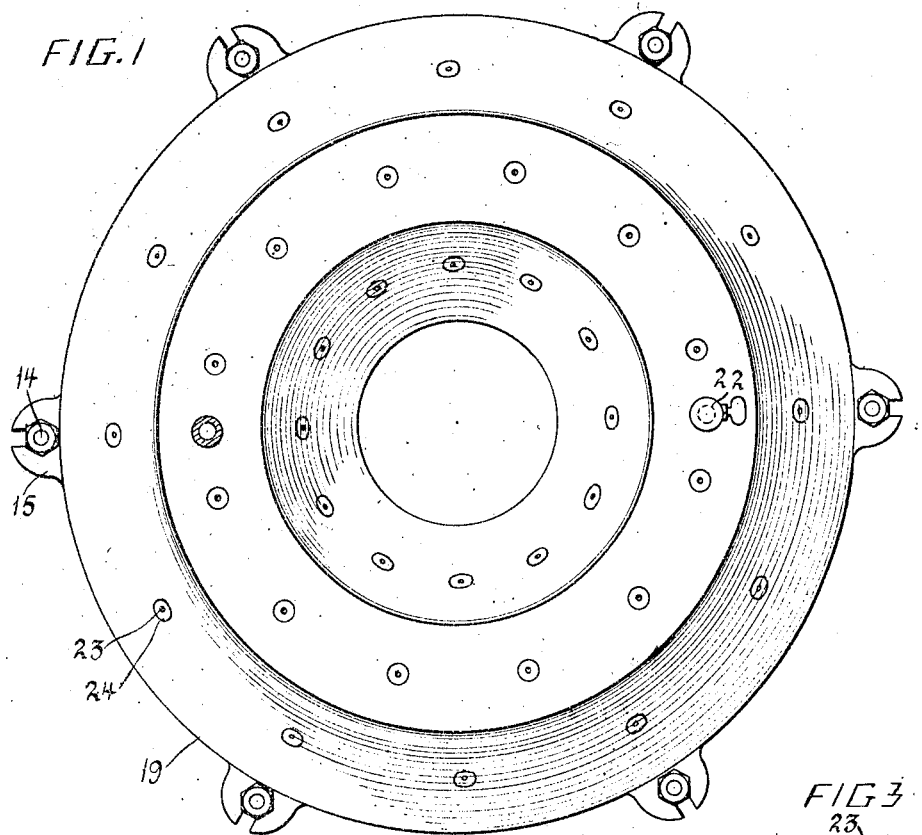
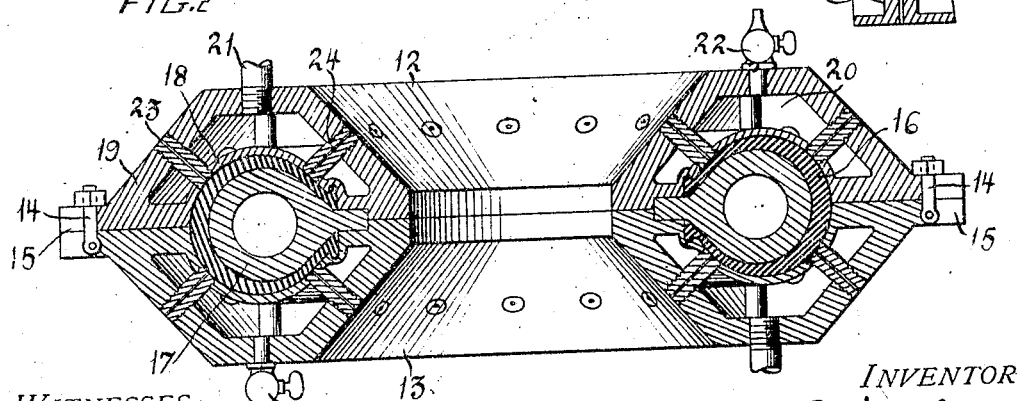

UNITED STATES PATENT OFFICE.

WILLIAM A. McCOOL, OF BEAVER FALLS, PENNSYLVANIA, ASSIGNOR TO HERCULES TIRE & RUBBER COMPANY, A CORPORATION OF DELAWARE.

VULCANIZING-MOLD.

1,019,506.        Specification of Letters Patent.        Patented Mar. 5, 1912.

Application filed December 2, 1910. Serial No. 595,282.

*To all whom it may concern:*

Be it known that I, WILLIAM A. McCOOL, a citizen of the United States, residing at Beaver Falls, in the county of Beaver and State of Pennsylvania, have invented or discovered certain new and useful Improvements in Vulcanizing-Molds, of which the following is a specification, reference being had therein to the accompanying drawings.

This invention relates to molds for vulcanizing plastic articles, and is herein shown and described as applied to a mold for vulcanizing pneumatic tires.

In the process of vulcanizing rubber and other plastic articles, as for example rubber tires, there are produced, within the body of the plastic, steam and gases, particularly sulfur bearing gases, which are diffused in the material, and are seriously detrimental to the vulcanized products in that they give a sponge-like character to said products.

The object of the present invention is to provide means whereby these gases, which are produced during the process of vulcanization, may be released during said process, and allowed to escape, thereby overcoming the difficulties above referred to.

To this end my invention comprises a vulcanizing mold having a surrounding heating jacket and provided with means for venting the vulcanizing chamber whereby the gases above referred to may be allowed to escape, as hereinafter more fully described.

The invention will best be understood from the following description of a form or embodiment thereof adapted for use in vulcanizing rubber pneumatic tires and illustrated in the accompanying drawings. It is to be understood, however, that the construction described and shown has been chosen for illustrative purposes merely, and that the invention may be embodied in many other forms and may be utilized in the manufacture of many other articles without departing from the spirit and scope thereof.

In said drawings Figure 1 is a plan view of a vulcanizing mold constructed in accordance with the invention. Fig. 2 is a transverse sectional view thereof. Fig. 3 is a detail sectional view illustrating a modified construction.

The mold herein shown comprises two complementary annular sections 12 and 13 secured together by suitable means, such as swing bolts 14 engaging ears 15, said sections inclosing a suitable vulcanizing chamber adapted to receive a tire 16 mounted on its molding core 17.

Each of the sections comprises an inner wall 18 inclosing the vulcanizing chamber and an outer wall 19 forming the jacket and inclosing a heating chamber 20 between said walls. Suitable heating fluid, preferably steam, is supplied to the chamber 20 of the jacket through suitable connections 21, said jacket being preferably provided with venting pet cocks 22 whose function will be clear to those skilled in the art. The inner wall 18 is preferably made relatively thin in order that the heat from the heating chamber of the jacket may be readily communicated to the article within the mold, while the outer wall 19 is preferably made relatively thick in order to retain the heat.

In order to provide for venting the vulcanizing chamber there are preferably provided a suitable number of vent apertures 23 extending from the vulcanizing chamber outwardly through the mold. In order to prevent the escape of steam from the heating chamber 20, either outwardly or into the vulcanizing chamber, these vent apertures, as herein shown, are formed through members extending between said inner and outer walls. Preferably these members will be made in the form of nipples 24 extending through said walls, and in screw threaded engagement therewith, as shown in Fig. 2, although, if desired, these members may be formed integral with said inner and outer walls, as shown at 240 in Fig. 3.

The number and arrangement of the vent apertures 23 will preferably be such that these apertures are distributed at suitable intervals throughout the entire body of the mold. As herein shown these apertures are arranged in three series in each section of the mold, the apertures of the respective series being staggered with respect to one another.

In use the tire or other article to be vulcanized is placed within the mold in the usual manner, and steam is admitted through the connections 21, the air or steam in the chamber of the jacket being first permitted to escape through the pet cocks 22, until the mold is heated to the desired temperature, after which said pet cocks are closed. After the vulcanizing chamber has become thoroughly heated a suitable pointed implement, such as an awl, may be inserted through the apertures 23 into the body of the tire or other article being vulcanized, thereby tapping the same and permitting the gases which have been formed therein to escape. This operation may be repeated from time to time if necessary during the process of vulcanization, and while the material is in a sufficiently plastic condition to close the openings made by the venting implement. In this manner the gases as they are formed may be allowed to escape from the article being vulcanized, and after the formation of these gases has ceased the process of vulcanization will be continued and the small punctures formed by the venting implement will be completely closed.

Having thus described my invention I claim and desire to secure by Letters Patent:

1. A jacketed vulcanizing mold comprising a vulcanizing chamber, a heating chamber outside of said vulcanizing chamber and tightly closed to the latter, an inlet for the heating medium through the outer wall of said heating chamber, and vent apertures passing from said vulcanizing chamber through said heating chamber and said outer wall, said apertures extending through conduits which are closed to said heating chamber.

2. A jacketed vulcanizing mold comprising a vulcanizing chamber, a heating chamber outside of said vulcanizing chamber and tightly closed to the latter, an inlet for the heating medium through the outer wall of said heating chamber, and nipples extending through both walls of the jacketed mold and provided with vent apertures extending from said vulcanizing chamber outward through the said heating chamber and its outer wall.

3. A jacketed vulcanizing mold comprising an inner wall inclosing a vulcanizing chamber, an outer wall inclosing a heating chamber outside of said inner wall, and nipples extending through said walls, said nipples having vent apertures extending from said vulcanizing chamber through the said heating chamber and the outer wall of the latter.

4. A jacketed vulcanizing mold comprising an inner wall inclosing a vulcanizing chamber, an outer wall inclosing a heating chamber outside of said inner wall, and apertured nipples extending through said walls and in threaded engagement therewith, said apertured nipples serving to vent said vulcanizing chamber through said heating chamber and said outer wall.

5. A jacketed vulcanizing mold comprising a relatively thin inner wall inclosing a vulcanizing chamber, a relatively thick outer wall inclosing a heating chamber outside of said inner wall, and apertured members extending between said walls, said members serving to vent said vulcanizing chamber through said heating chamber and said outer wall.

In testimony whereof I affix my signature, in presence of two witnesses.

WILLIAM A. McCOOL.

Witnesses:
EARL R. LEYDA,
A. R. LEYDA.